United States Patent [19]

Gale et al.

[11] Patent Number: 4,740,337

[45] Date of Patent: Apr. 26, 1988

[54] POWDER SLUSH PROCESS FOR MAKING PLASTIC ARTICLES

[75] Inventors: Richard S. Gale, Iowa City, Iowa; Robert L. Hanson, Grosse Pte. Farms, Mich.; Michael L. Piechura, Detroit, Mich.; Richard E. Warnick, Birmingham, Mich.

[73] Assignee: Sheller-Globe Corporation, Toledo, Ohio

[21] Appl. No.: 866,948

[22] Filed: May 27, 1986

[51] Int. Cl.⁴ .................. B29C 41/04; B29C 41/18; B29C 41/52

[52] U.S. Cl. .................................. 264/40.6; 264/37; 264/302; 264/306; 425/DIG. 39; 425/144

[58] Field of Search .................. 264/302, 306, 40.6; 425/DIG. 39, 144

[56] References Cited

U.S. PATENT DOCUMENTS

| | | |
|---|---|---|
| 2,880,468 | 4/1959 | Mooney .................. 264/302 |
| 2,950,505 | 8/1960 | Frank .................. 264/302 |
| 2,964,798 | 12/1960 | Ferrell .................. 264/302 |
| 3,914,361 | 10/1975 | Shiina et al. . |
| 3,932,107 | 1/1976 | Proudfit . |
| 3,940,528 | 2/1976 | Roberts . |
| 4,001,062 | 1/1977 | Iisaka et al. . |
| 4,049,767 | 9/1977 | Vaidya . |
| 4,060,364 | 11/1977 | Gras . |
| 4,076,781 | 2/1978 | Clay et al. .................. 264/146 |
| 4,082,584 | 4/1978 | Satriana et al. . |
| 4,109,897 | 8/1978 | Mehrkam .................. 266/120 |
| 4,139,590 | 2/1979 | Rubright . |
| 4,292,015 | 9/1981 | Hritz . |
| 4,420,447 | 12/1983 | Nakashima . |
| 4,506,722 | 3/1985 | Yamaguchi et al. . |
| 4,562,025 | 12/1985 | Gray .................. 264/126 |
| 4,606,868 | 8/1986 | Christoph et al. .................. 425/256 |
| 4,615,849 | 10/1986 | Hahn .................. 264/40.6 |

FOREIGN PATENT DOCUMENTS

| | | | |
|---|---|---|---|
| 3417727 | 3/1984 | Fed. Rep. of Germany . | |
| 46-29632 | 8/1971 | Japan .................. | 264/147 |
| 6117614 | 9/1981 | Japan .................. | 264/306 |
| 2136114 | 9/1984 | United Kingdom .............. | 264/40.6 |

Primary Examiner—Jan H. Silbaugh
Assistant Examiner—James Bartholomew
Attorney, Agent, or Firm—Harness, Dickey & Pierce

[57] ABSTRACT

The plastic molded article is produced by heating a mold by contact with a preheated salt bath. The salt bath is readily maintained at a uniform temperature and is self-insulating for energy efficiency. A noncontact infrared sensor monitors the mold cavity temperature while in the salt bath, and the mold is removed from the bath when the proper mold temperature is reached. A charge of plastic powder is introduced into the mold by clamping the mold to a powder slush box with the mold cavity confronting the opening of the box. The mold and box are then simultaneously rotated to pour the plastic charge into the mold. The plastic charge forms a skin on the cavity surface and additional plastic material may be built up to provide additional thickness. The mold and box are then separated; the mold is then post-cured and cooled, whereupon the finished article may be removed from the mold.

19 Claims, 1 Drawing Sheet

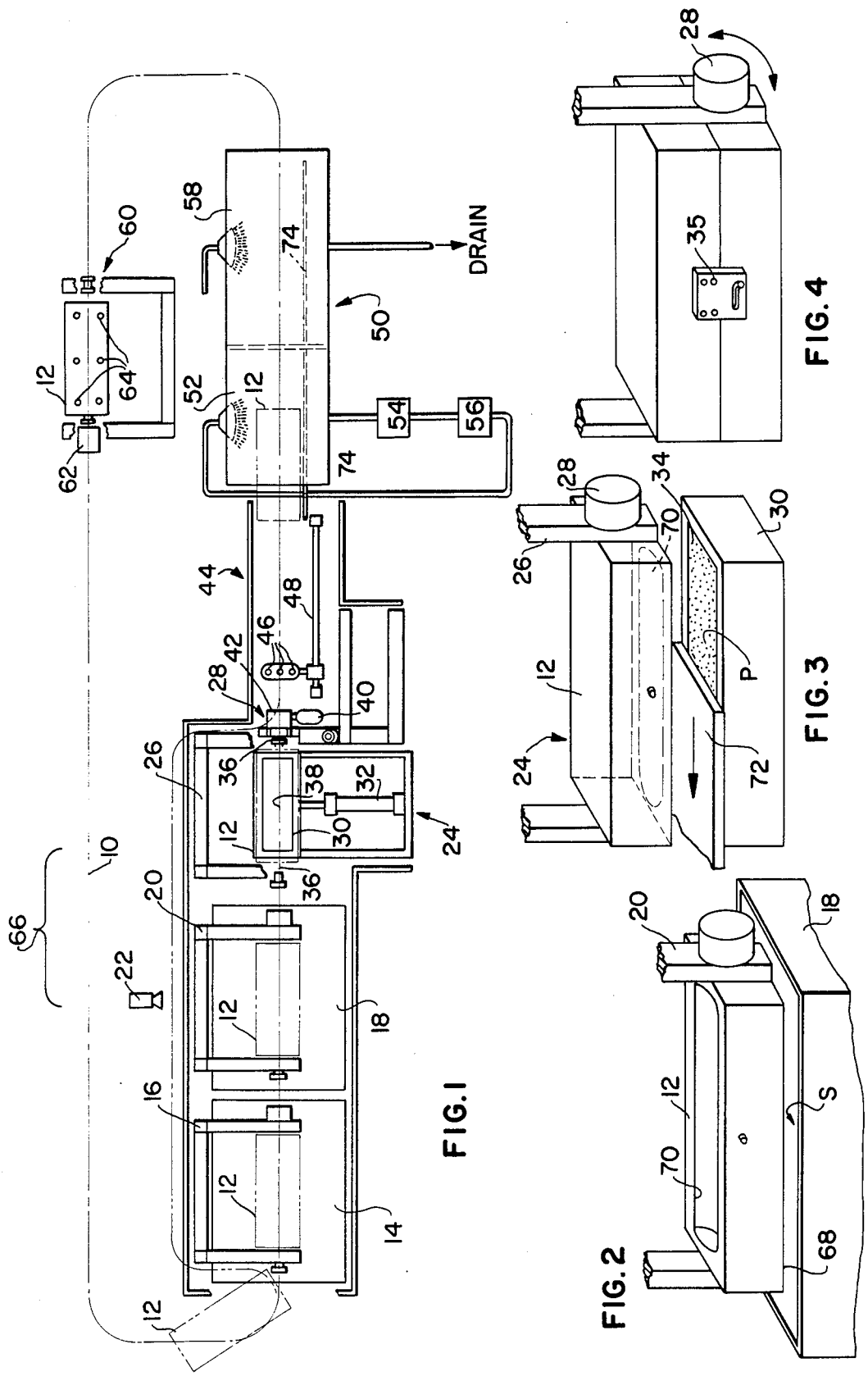

POWDER SLUSH PROCESS FOR MAKING PLASTIC ARTICLES

BACKGROUND AND SUMMARY OF THE INVENTION

The present invention relates generally to plastic molding and more particularly to a process and apparatus for forming molded plastic articles, such as automotive parts, dashboards and the like.

In slush casting of thin-walled articles from castable plastic material, such as plastisol and pourable plastic powders, it is known to preheat a mold in a hot air furnace to a temperature above the optimum molding temperature, to remove the mold from the furnace, and to allow the mold temperature to drop to the desired optimum molding temperature. According to known practice, the heated mold is then filled with liquid plastic, such as plastisol or pourable plastic powder, the mold is rotated and the plastic is allowed to set up and cure in the heated mold.

According to this known practice, the desired mold temperature is determined by overheating the mold and then allowing the mold to cool for a predetermined time, selected based upon a previously measured or known time-temperature curve for the mold being used. Hence, achieving the correct mold temperature is a matter of controlling the time after the mold is removed from the heating oven until the plastic material is added. The accuracy of such a technique in achieving the correct mold temperature thus depends upon the accuracy of the time-temperature curves for the particular mold. In practice, different molds may have subtle or even substantial differences in time-temperature characteristics, so that the optimum mold temperature is at best an approximation. Deviations from the optimum mold temperature can result in lack of uniformity in the molded articles and high scrap rates or reject rates.

In addition to poor mold temperature control, hot air furnaces used in the prior art are energy inefficient and expensive to operate. Each time the furnace or oven is opened to insert or remove a mold, much energy is lost as waste heat. This waste heat places an additional burden on the manufacturing facility's air conditioning equipment and the cost of this waste heat is reflected in a higher per unit cost for manufacturing the plastic article.

The present invention overcomes the above deficiencies by providing a process and apparatus for forming molded plastic articles in which the mold is heated by contact with a heated salt bath. The mold temperature is monitored by a noncontact sensor while the mold is in the salt bath. The mold is removed from the salt bath and a plastic material is added as soon as the optimum mold temperture is reached. The invention thus places no critical reliance on time-temperature curves, which can vary from mold to mold. In addition, the salt bath is self-insulating; hence, very little waste heat is lost to the environment.

According to the invention, a process for forming a molded plastic article comprises providing a mold having a cavity and an external surface, and also providing a salt bath at a first predetermined temperature. The cavity is heated by contacting the external surface of the mold with the salt bath, the mold is then removed from the salt bath and a plastic material is placed in the heated cavity and is allowed to cure into the plastic article. The plastic article is then removed from the cavity.

The invention also provides a method for forming a molded plastic article comprising providing a mold having a cavity and exposing the mold to a heat source. While the mold is exposed to the heat source, the mold temperature is sensed and the mold is removed from the heat source when a predetermined mold temperature is reached. A plastic material is then placed in the cavity and allowed to cure into the plastic article. The plastic article is then removed from the cavity.

The invention is well adapted for automated assembly line applications. Thus, the invention also provides an apparatus for forming a molded plastic article comprising a salt bath heating station having a means associated with the heating station for sensing mold temperature. The apparatus provides at least one mold having an internal cavity and an external surface. A charging station is also provided, including a container for holding a supply of plastic material, the container having an opening therein through which a charge of plastic material may be introduced into the mold cavity.

The invention further comprises a means for placing the external surface of the mold in contact with the salt bath, to thereby heat the internal cavity. A means for conveying the mold from the heating station to the charging station is also provided.

The invention further comprises a means for placing the mold in registration with the container opening, with the cavity facing into the opening. The invention provides a means for simultaneously rotating the mold and the container about a common axis to thereby introduce a charge of plastic material into the cavity.

For a more complete understanding of the invention, its objects and advantages, reference may be had to the accompanying drawings and to the following specification.

BRIEF DESCRIPTION OF THE DRAWINGS

FIG. 1 is an overall system view of the invention;

FIG. 2 is a diagrammatic perspective view illustrating the heating of the mold by contacting the external surface with a salt bath;

FIG. 3 is a diagrammatic perspective view depicting the position of the mold and slush box container prior to registration with one another; and FIG. 4 is a diagrammatic perspective view illustrating the slush box and mold clamped together for mutual rotation.

DESCRIPTION OF THE PREFERRED EMBODIMENT

Referring to FIG. 1, the presently preferred apparatus for practicing the invention is illustrated. The invention may be viewed as comprising a number of stations at which given processes are performed upon a given mold and its contents. The presently preferred embodiment uses a power and free conveyor 10 to transport or convey one or more mold assemblies from station to station. In FIG. 1, six mold assemblies, each designated by reference numeral 12, are illustrated at selected stations.

Starting at the left hand side of FIG. 1, the first station is the preheating salt bath station 14. This salt bath comprises a molten mixture of sodium nitrate, sodium nitrite and potassium nitrate at approximately 335° Fahrenheit. A suitable salt bath may be provided using Parcure 305 Grade Salt from Park Chemical Company, Detroit, Mich. A first lowerator 16 is positioned above salt bath 14 to raise and lower a mold assembly into and out of the salt bath 14.

Located adjacent salt bath 14 is high temperature salt bath 18. Salt bath 18 comprises a molten mixture of sodium nitrate, sodium nitrite and potassium nitrate. Parcure 305 Grade Salt from Park Chemical Company, Detroit, Mich., is suitable for this purpose. Salt bath 18 is preferably maintained at 575° Fahrenheit. Second lowerator 20 is positioned above salt bath 18 for raising and lowering the mold assembly into salt bath 18. Salt baths 14 and 18, and the associated lowerators 16 and 20, comprise the salt bath heating station in which the mold is brought to proper mold temperature. FIG. 2 depicts the salt bath 18 station in greater detail. Salt bath 14 is maintained at a lower temperture than salt bath 18 and serves to reduce thermal shocking which might otherwise crack a mold. While the use of a preheating salt bath is preferred, the invention may be practiced using only one salt bath.

Positioned above salt bath 18 is noncontact temperature sensor 22. Preferably, temperature sensor 22 is an infrared sensor focused on the mold while the mold is in the high temperature salt bath 18.

Adjacent salt bath 18 is the charging station 24. It is at the charging station that a charge of powdered plastic material is introduced into the cavity of a heated mold to form the plastic article. The charging station is also illustrated in FIG. 3. Charging station 24 includes lowerator 26 for raising and lowering the mold assembly onto the rotation mechanism 28. Charging station 24 also includes a slush box container 30 which is used to contain a supply of powdered plastic. Container 30 is mounted upon an hydraulic shuttle 32 which raises and lowers the slush box container 30 to and from rotation mechanism 28. Slush box container 30 has an opening 34 (FIG. 3) in the top thereof through which a charge of plastic material P may be introduced into the mold. Preferably, container 30 also has a lid plate 72 for closing the opening 34 to prevent salt drippings from contaminating the contents of the container. For this purpose, both slush box container and mold are preferably provided with a flanged rim around their respective peripheries which are brought into registration with one another after mold 12 has been rotated by rotation mechanism 28 into a cavity-down position and container 30 is raised to the uppermost position shown in FIG. 1. The flanged rims are then secured together as by clamping with suitable clamp 35 (as illustrated in FIG. 4), so that opening 34 and the mold cavity are in face-to-face relation to one another. Once clamped together in this fashion, the mold assembly and slush box container 30 may be rotated simultaneously about the common axis of rotation mechanism 28. As illustrated in FIG. 1, rotation mechanism 28 includes a pair of spindles 36 which define the axis of rotation 38. At least one of these spindles is driven by servomotor 40 and speed reducer 42.

Adjacent the charging station 24 is postcuring station 44. In the preferred embodiment, the postcuring station comprises a plurality of hot air blowers 46 which are positioned to direct heated air onto selected points along the mold. The mold is indexed into the postcuring station where it remains for a predetermined length of time sufficient to cure the plastic article.

As an alternative to the fixed or stationary blowers, the postcuring station may include hot air blowers 46 which ride along blower shuttle 48. The speed of blower shuttle 48 is preferably adjusted so that the hot air blowers 46 follow the mold as it progresses through the postcuring station. Preferably, the blower shuttle speed is adjusted so that the hot air blowers move more slowly than the mold being carried through the postcuring station by power and free conveyor 10. This ensures that the entire mold receives the hot air postcuring treatment.

Adjacent postcuring station 44 is the cooling station 50. Preferably, cooling station 50 is a two-stage station. The first cooling stage 52 is a circulated water cooling stage which includes a salt recovery apparatus 54 and heat exchanger 56. The second cooling stage 58 is preferably in the form of a spray or waterfall through which the mold assembly is passed. The spray is presently preferred since sprayed water tends to vaporize or turn to steam more readily, which reduces thermal shocking of the mold. If desired, some of the water from the second stage may be passed through heat exchanger 56 to cool the water being circulated through the first cooling stage 52. Any salt recovered from salt recovery apparatus 54 may be returned to either of the salt baths 14 and 18.

Following the cooling station, power and free conveyor 10 leads to the finished part removal station 60. Removal station 60 includes rotation mechanism 62 for rotating the mold assembly to a position at which a human operator may remove the finished part by peeling it from the mold. Station 60 also includes one or more air blow guns 64 for cleaning the mold cavity after the article has been removed and prior to sending the mold back to the salt bath heating station.

In operation, one or more mold assemblies are placed sequentially along the power and free conveyor, preferably at the ready station designated generally by reference numeral 66. The power and free conveyor is then energized, causing one of the molds to advance to the salt bath station 14. At this point the mold assembly is automatically unlatched from the power and free conveyor. Next, if not already in this position, the mold is rotated to the home position. The home position is the position in which the external surface 68 of the mold is facing downwardly and the mold cavity 70 is facing upwardly. The mold is lowered by the lowerator into salt tank 14 unitl the external surface 68 contacts the salt bath. Care is taken to prevent salt from contacting the mold cavity 70. The mold remains in salt bath 14 until the mold reaches an average temperature of 250° Fahrenheit. Under normal operating conditions using a 335° Fahrenheit salt bath, a mold will reach the 250° Fahrenheit temperature in approximately forty-five seconds. The mold is, therefore, preheated in salt bath 14 for approximately forty-five seconds or until the mold reaches a preheated temperature of approximately 250° Fahrenheit.

Next, the mold is raised from salt bath 14, positioned over salt bath 18 and lowered into salt bath 18 until the external surface 68 contacts that salt bath. Again, care is taken to prevent salt S in the salt bath from contacting the mold cavity. In salt bath 18, the mold is permitted to heat to the desired molding temperature, nominally 475° Fahrenheit, for example. Temperature sensor 22 monitors the heat radiated from the mold cavity and thereby determines when the correct mold temperature is reached. Once the correct temperature is reached, the mold is raised from salt bath 18 and conveyed to the charging station. During the trip en route to the charging station, the mold is allowed to equalize in temperature. In practice, it takes a few seconds for the temperature throughout the mold to equalize or become uniform.

At the charging station, the mold is rotated 180° to the charging position using rotation mechanism 28. In the charging position, the mold cavity faces downwardly and the external surface faces upwardly. The mold is then lowered on the lowerator while the slush box container 30 is simultaneously raised by the hydraulic shuttle 32. During these rotation and raising operations, the slush box lid plate 72 prevents salt from dripping into the container. Once the mold and slush box container are positioned adjacent one another, the slush box lid plate 72 is extracted to one side to allow the mold cavity and container opening 34 to register with one another. The mold and container are urged into contact with one another and clamps are applied to hold the outer peripheries of the container and mold together. Slush box container 30 is filled with a quantity of plastic material P, preferably polyvinylchloride (PVC) in powdered form having a particle size of approximately five (5) to seven hundred (700) microns. The invention may be practiced using other plastic materials as well, including polyethylene, polypropylene, polystyrene, nylon, polycarbonate, cellulose acetate and elastomer polyester or mixtures thereof.

The mold and slush box container now clamped together, are raised above the shuttle 32 a sufficient distance to permit rotation. The mold and attached slush box container are then rotated using rotaion mechanism 28 for a predetermined number of rotations in one direction, followed by a predetermined number of rotations in the reverse direction. During rotation, a charge of plastic powder is introduced by spilling through opening 34 into the mold cavity. The cavity is at a molding temperature sufficient to melt the plastic material upon contact, thereby forming a skin on the walls of the mold cavity. Additional plastic material adheres to the inner side of the skin so formed, to give the plastic article greater thickness. Rotation of the mold in both directions encourages the plastic powder to fill any recesses in the mold.

After a sufficient number of rotations have been performed, the mold and slush box container are rotated so the container opening faces upwardly. The container and mold are then lowered as a unit onto the hydraulic shuttle 32. The mold is then unclamped from the slush box container, the mold is raised and the container is lowered, and the lid plate 72 is replaced.

The mold is then moved or indexed to the postcuring station 44. Once in the postcuring station, the hot air blowers 46 are turned on to direct blasts of hot air onto the plastic article now adhered to the mold cavity. Preferably, the mold remains in the postcuring station for a predetermined time sufficient to effect postcuring. As stated above, the fixed blower postcuring station is presently preferred although a moving blower process may also be implemented. In the moving blower process as the mold enters the postcuring station, or prior thereto, the hot air blowers 46 are moved to the starting postion (the left side of shuttle 48) and the blowers are turned on to direct hot air onto the plastic now adhered to the mold cavity. The mold continues to move along conveyor 10 and blowers 46 move with the mold via shuttle 48. Because the shuttle speed is slower than the conveyor speed, the hot air blowers initially direct hot air into the right most side of the mold, but as movement progesses, the blowers lag behind the conveyor and proceed to direct hot air onto the center of the mold and finally onto the left most side of the mold. The hot air from blowers 46 help set up and cure the plastic material on the inside of the part (farthest from the outer skin). During the postcuring operation, the mold still retains sufficient heat to contribute to the curing process.

While hot air blowers are presently preferred in the postcuring station, alternative curing means may be used. For example, infrared heat lamps, and not air ovens, may be used. Also, if desired, salt bath heating may be employed to reheat the mold to a temperature sufficient to effect curing of the interior side of the article. In this regard, separate salt bath stations may be employed, or alternatively, either or both of salt baths 14 or 18 may be reused for this purpose. When using salt bath heating, care should be taken to prevent the plastic material from dripping into the bath and to prevent overheating should the production line shut down while a charged mold is in the bath. Furthermore, in addition to supplying additional postcuring heat, via hot air blowers or salt bath stations, in some applictions it may be desirable to wait a predetermined time at the curing station to allow the mold's internal heat to cure the article.

Next, the mold and plastic article adhered therein are moved to cooling station 50. Preferably, the mold is positioned with cavity 70 pointing downwardly to prevent coolant from contacting the plastic article. If desired, a protection plate 74 is positioned in the cooling station adjacent cavity 70 to prevent any water from splashing into the cavity. As the mold enters the first cooling stage 52, a jet spray or waterfall of recirculated water is directed at the mold. The water is maintained at a cooler temperature than the mold using heat exchanger 56 or by introducing fresh cool water to the recirculating water. The water coming in contact with the mold removes heat from the mold and also washes away any salt adhering to the external surface of the mold. This salt, now in water solution, is recovered in salt recovery apparatus 54 for replenishing the salt baths 14 and 18. Preferably, the recovered salt should be substantially free of water before adding it to the salt baths.

The mold then progesses to the second cooling stage 58 which is preferably a spray of nonrecirculated fresh water. Because the first stage of cooling removes much of the mold heat and most of the salt adhering to the mold, the waste water from the second cooling stage may be disposed of without requiring special treatment.

Finally, the mold is conveyed to the removal station 60 where it is rotated, preferably 90°, to facilitate the stripping of the finished article from the mold by hand. Once the finished article has been peeled away from the mold, the mold cavity is inspected and blown clean of any residual plastic using air blow guns 64. When the mold is clean, the operator presses palm buttons which cause the mold to rotate to the home position, and the mold is then returned to the ready station 66 for repeating the process.

The process may be implemented whereby only one mold is connected in the conveyor loop at any one time. Preferably, several molds may be placed in the loop, using control circuits to regulate the progress each mold makes from station to station. Also, if desired, certain stations on all of the stations may be implemented in parallel for greater production throughput. In this regard, salt baths 14 and 18 may be sufficiently large to accommodate several molds simultaneously. Following the salt bath stations, the power and free conveyor might separate into a plurality of separate tracks, each track leading to a different slush box container and associated shuttle mechanism. In this way, the thermal resources of salt baths 14 and 18 may be shared among molds of different sizes and shapes. The slush box containers would be separated so that each container would correctly fit the mold to which it is dedicated.

In addition to permitting the sharing of thermal resources, the salt bath heating station also conserves energy. It has been found that molten salt has a high heat capacity and a rate of heat exchange approximately six times greater than that of air. The salt bath heating station is thus much smaller than a comparable hot air installation. Moreover, temperature uniformity throughout the salt bath may be readily maintained. It has been found that the molten salt bath is noncorrosive, hence, molds can be reused over and over. Also, molten salt is self-insulating. It has been found that at a distance of only six inches above the surface of a 575° salt bath, the ambient air temperature may be on the order of 175°. This demonstrates that very little heat is lost as waste heat to the atmosphere. This is a decided advantage over hot air oven or furnace type heating techniques. In addition, the use of a salt bath permits the mold cavity temperature to be monitored using noncontact infrared sensors while the mold is in the heating station. This is also an advantage as it permits the mold to be heated to the proper molding temperture without undue overheating of the mold or underheating of the mold.

While the invention has been described in connection with its presently preferred embodiment, it will be understood that the invention is susceptible to modification and change without departing from the spirit of the invention as set forth in the appended claims.

What is claimed is:

1. A process for forming a molded plastic article comprising:
   providing a mold having an exposed cavity-defining surface and an external surface;
   providing a salt bath at a first predetermined temperature;
   heating said cavity-defining surface by contacting said external surface of said mold with said salt bath;
   sensing the cavity-defining surface temperature of said mold while said external surface is contacting said salt bath using a noncontact infrared sensor focused on said cavity-defining surface and not on said salt bath;
   removing said contact between said external surface and said salt bath when a predetermined sensed mold temperature is reached;
   then placing a plastic material in said heated cavity and allowing said material to cure into said plastic article; and
   removing said plastic article from said cavity.

2. The process of claim 1 wherein said step of placing a platic material in said heated cavity comprises:
   providing a container of said plastic material, said container having an opening;
   placing said mold in registration with said opening with said cavity facing into said opening; and
   simultanously rotating said mold and container about a common axis to thereby cause said plastic material to enter said cavity through said opening.

3. The process of claim 1 further comprising heating said cavity-defining surface to above the melting temperature of said plastic material.

4. The process of claim 1 further comprising heating said cavity-defining surface to above the melting temperature of said plastic material by controlling the time in which said external surface contacts said salt bath.

5. The process of claim 4 wherein said time is determined by measuring the temperature of said cavity-defining surface.

6. The process of claim 1 wherein said plastic material placed in said heated cavity is a powder.

7. The process of claim 1 further comprising providing a preheating salt at a second predetermined temperature lower than said first predetermined temperature and preheating said cavity-defining surface by contacting said external surface of said mold with said second salt bath.

8. The process of claim 1 wherein said first predetermined temperature is approximately 575° Fahrenheit.

9. The process of claim 7 wherein said second predetermined temperature is approximately 335° Fahrenheit.

10. The process of claim 1 where said salt bath comprises an alkali metal salt in a moten state.

11. The process of claim 10 wherein said alkali metal salt is selected from the group consisting of sodium nitrate, sodium nitrite, potassium nitrate, or mixtures thereof.

12. The process of claim 1 wherein said plastic material is selected from the group consisting of polyethylene, polypropylene, polystyrene, nylon, polycarbonate, cellulose acetate, elastomer polyester, and mixtures thereof.

13. The process of claim 6 wherein said powder has a particle size of approximately 5 to 700 microns.

14. The process of claim 2 wherein said rotating step is performed by rotating said mold and container in both clockwise and couterclockwise directions about said axis.

15. The process of claim 2 wherein said rotating step is performed by rotating said mold and container at least 180° about said axis.

16. The process of claim 1 further comprising cooling said mold after said step of placing a plastic material in said heated cavity.

17. The process of claim 16 wherein said cooling step is performed by contacting said mold with water.

18. The process of claim 17 further comprising recovering salt from said water and returning said recovered salt to said salt bath.

19. The process of claim 1 wherein said predetermined sensed mold temperature is greater than the melting temperature of said plastic material.

* * * * *

UNITED STATES PATENT AND TRADEMARK OFFICE
CERTIFICATE OF CORRECTION

PATENT NO. : 4,740,337

DATED : 4/26/88

INVENTOR(S) : Richard S. Gale, et al

It is certified that error appears in the above-identified patent and that said Letters Patent is hereby corrected as shown below:

| | | |
|---|---|---|
| Col. 5 | Line 30 | rotaion should be --rotation-- |
| Col. 6 | Line 22 | applictions should be --applications-- |
| Col. 6 | Line 68 | throughput should be --throughout-- |
| Col. 8 | Line 23 | insert -- bath -- after salt |
| Col. 8 | Line 33 | moten should be --molten-- |
| Col. 8 | Line 47 | couterclockwise should be --counterclockwise-- |

Signed and Sealed this

Twenty-second Day of November, 1988

*Attest:*

DONALD J. QUIGG

*Attesting Officer*   *Commissioner of Patents and Trademarks*